(12) United States Patent  
Sandri et al.

(10) Patent No.: US 8,220,812 B2
(45) Date of Patent: Jul. 17, 2012

(54) INDEPENDENT REAR SUSPENSION FOR AN AGRICULTURAL VEHICLE

(75) Inventors: Silvano Sandri, Saluzzo (IT); Valter Asteggiano, Pocapaglia (IT)

(73) Assignee: CNH America LLC

( * ) Notice: Subject to any disclaimer, the term of this patent is extended or adjusted under 35 U.S.C. 154(b) by 266 days.

(21) Appl. No.: 12/607,379

(22) Filed: Oct. 28, 2009

(65) Prior Publication Data

US 2010/0109275 A1    May 6, 2010

(30) Foreign Application Priority Data

Oct. 30, 2008  (IT) .............................. TO2008A0806

(51) Int. Cl.
*B60G 3/14* (2006.01)
(52) U.S. Cl. .............................................. 280/124.153
(58) Field of Classification Search ........... 280/124.135, 280/124.153; 180/348, 349, 353, 355, 356, 180/359, 360, 372
See application file for complete search history.

(56) References Cited

U.S. PATENT DOCUMENTS

| 7,204,340 | B2 | 4/2007 | Bordini |
| 2002/0125056 | A1* | 9/2002 | Woods et al. ................ 180/233 |
| 2002/0175486 | A1 | 11/2002 | Young et al. |
| 2003/0047892 | A1 | 3/2003 | Goddard |
| 2003/0150664 | A1* | 8/2003 | Woods et al. ................ 180/348 |
| 2007/0235972 | A1* | 10/2007 | Schmitz ................ 280/124.156 |

* cited by examiner

*Primary Examiner* — Paul N Dickson
*Assistant Examiner* — Robert A Coker
(74) *Attorney, Agent, or Firm* — Sue C. Watson; Patrick Sheldrake

(57) ABSTRACT

An independent suspension for a rear wheel of an agricultural vehicle includes upper and lower longitudinal trailing members that are each secured at a chassis location for pivoting movement about respective upper and lower, horizontally extending axes. A planetary gear mount is secured between the trailing members at upper and lower attachments that are spaced from the chassis ends of the trailing members; and a spring attachment protrudes from the planetary gear mount.

17 Claims, 3 Drawing Sheets

INDEPENDENT REAR SUSPENSION FOR AN AGRICULTURAL VEHICLE

This invention relates to an independent rear suspension (IRS) for an agricultural vehicle, especially but not limited to a tractor.

As is explained in U.S. Pat. No. 7,204,340 (the entire disclosure of which is incorporated herein by reference), the development of IRS designs for tractors and other agricultural vehicles is a relatively recent phenomenon, despite the fact that tractors have been in use since the early 1800's.

The slowness to develop suspension systems has been in part a result of the patterns of use of tractors in their early history. A further reason, that is explained in detail in U.S. Pat. No. 7,204,340, is related to the reaction forces that can arise during use of a tractor when towing an implement such as a plough or other tilling device.

Agricultural tractors tend to have large rear wheels, of the order of 1-2.2 metres in diameter. The large rear wheels apply a significant force to the ground, especially when a ground-engaging implement is ripping furrows through the ground. The furrows may be 50-450 millimetres deep and in consequence the ground applies a high reaction force, to the frame of the tractor, that equals the force applied by the wheels.

Despite attempts by tractor designers to minimise its effects, the reaction force acts at a point that is offset behind the rear axles of the tractor. It therefore generates a moment on the frame of the tractor tending to rotate the front part of the tractor upwardly about a point referred to in U.S. Pat. No. 7,204,340 as the "centre of pitch" ($C_P$). This moment can exceed the moment acting in the opposite sense about $C_P$ caused by the mass of the tractor engine and the front part of the frame lying in front of the rear axles.

As a result an implement towed by a tractor that omits a suspension can generate a moment that is great enough to lift the front wheels of the tractor clear of the ground by up to a metre.

As is also explained in U.S. Pat. No. 7,204,340, a suspension system interposed between the tractor rear axle and the vehicle frame would, when a significant force arises from towing of an implement, cause the tractor to "squat" before lifting of the front parts of the tractor occurs.

Such squatting is unacceptable from the standpoint of operator comfort; and also renders less effective (or indeed ineffective) control systems of the vehicle whose aim is to maintain the towed implement at a constant depth (so that the furrows, etc, cut are all of the same depth even if the "strength" of the soil varies in a field).

In either case squatting of the tractor is undesirable; and anyway merely installing a spring and damper suspension into a tractor would not guarantee that lifting of the front axle does not occur.

U.S. Pat. No. 7,204,340 proposes as a solution to these problems an arrangement in which the left and right rear axle assemblies are supported by respective trailing arms that are pivotably fixed at their forward ends to the frame of the tractor.

At their rear ends the trailing arms include eyes that act as pivot mounts for left and right suspension springs (the term "spring" herein being taken to include a spring and damper combination, as well as other forms of spring). The springs interconnect the trailing arms and the frame of the tractor behind the rear axles of the vehicle.

Each of the trailing arms includes a circular aperture lying part-way between its forward end and its rear spring eye. The circular outer casing of a respective left- or right-hand side planetary gear transmission unit is secured in each aperture by means of a series of bolts that rigidly fix a flange on the outer periphery of the casing in the aperture.

As a result the casings are secured against rotation relative to the trailing arms during motion of the tractor.

An outer ring gear of the planetary gear transmission is fixed to the inside of the casing.

Each of the planetary gear transmissions includes a rotary input shaft that feeds drive from the main driveshaft of the vehicle into one side of the planetary gear arrangement; and a rotary output shaft that protrudes on the opposite side of the casing to the input shaft.

The nature of the transmission path through each of the planetary gear transmissions is such that the fixing of the ring gear relative to the trailing arm causes the planetary gear transmission to generate a moment, acting on the trailing arm, that opposes both the tendency of the vehicle to squat on its suspension and to lift its front axle when the reaction force generated by a towed implement is high enough otherwise to cause these effects. The transmissions however also permit the transmission of rotary drive by way of the input and output shafts.

The output shafts include pairs of length-adjustable, flexible (articulation) joints that permit the length and transmission angle of each output shaft to adjust. Such joints accommodate changes in the height of the trailing arms relative to the vehicle frame as the suspension acts to absorb the effects of undulations in the ground surface over which the vehicle travels.

Overall the arrangement U.S. Pat. No. 7,204,340 overcomes the main prejudices, in the prior art, against using rear suspension systems in agricultural vehicles such as tractors. The arrangement however is susceptible to development and it is an aim of the invention to provide improvements over the designs disclosed in the prior art publication.

According to the invention in a first aspect there is provided an IRS according to claim 1.

An advantage of providing upper and lower trailing members that are pivotable about respective, upper and lower axes is that the IRS can be made more resistant to moments acting horizontally, that tend to cause rotation of the trailing members, than the single trailing arm of U.S. Pat. No. 7,204,340.

When the suspension acts to accommodate ground surface undulations the trailing members pivot upwardly and downwardly relative to the frame of the tractor. In the case of the previous arrangements the movement of the planetary gear transmission is as a result a simple, arcuate motion. This means that the camber angle and, depending on the trailing arm design, the toe-in of the rear wheel can alter during operation of the suspension. For various reasons these phenomena can be undesirable. The provision however of upper and lower trailing members in accordance with the invention means that the motion of the suspension resembles more closely a parallelogram than in the prior art suspension design. As a result problems of camber and toe-in alteration are overcome or at least ameliorated.

Furthermore the load distribution in the suspension components is better in the arrangement of the invention than in the prior art design. As a consequence there is a reduced tendency towards dry friction in the articulation joints of the output shafts of the planetary gear transmissions.

Preferably the IRS of the invention includes one or more interface members for securing each trailing member to a vehicle chassis, the interface member(s) and the chassis locations of the trailing members defining respective upper and lower pin joints that pivotably secure the trailing members and define the upper and lower, horizontally extending axes.

Such an arrangement advantageously avoids the need extensively to re-design the frame of the vehicle in order to accommodate the IRS of the invention. Therefore existing tractor designs can easily be modified so as to incorporate the IRS of the invention.

Preferably at least one of the trailing members is a generally triangular, longitudinally trailing member that is pivotably secured at two or more spaced locations along the horizontally extending axis about which it pivots.

Thus each of the trailing members preferably confers good stability advantages. Such arms may take a variety of forms and need not be bifurcated as is the case in some known longitudinally trailing arm designs.

Advantageously the planetary gear mount is or includes an annulus that has formed therein or secured thereto one or more fixings permitting securing to the planetary gear mount of a part of a planetary gear transmission.

The annulus may conveniently be formed as a discrete component that can be assembled into the IRS of the invention during manufacture. Since the planetary gear mount is essentially annular in preferred embodiments of the invention it is stable and resists torsion that might otherwise distort it or cause vibration.

A further advantage of forming the planetary gear mount as an annulus is that beneficially the one or more fixings when present may include a series of apertures or recesses that are formed at equiangularly spaced intervals about the annulus. This means that the forces generated in the planetary gear transmission that the mount must resist are distributed evenly about the mount, such that uneven stressing of the latter does not arise.

Preferably the IRS of the invention includes a planetary gear transmission having an outer periphery and secured to the planetary gear mount such as to prevent rotation of the outer periphery relative to the planetary gear mount.

In preferred embodiments of the invention the planetary gear transmission the outer periphery is or includes a circular periphery that is secured relative to the planetary gear mount, and more particularly is received in the annulus.

Conveniently the circular periphery is secured to the planetary gear mount by way of the one or more fixings. As a result when the planetary gear transmission includes a ring gear that is fixed relative to the circular periphery the advantages of the IRS of U.S. Pat. No. 7,204,340, in counteracting the moments that cause squatting of the rear suspension and raising of the front axle of the tractor, readily arise.

In an alternative arrangement, however, within the scope of the invention the planetary gear mount includes formed integrally therewith a casing of a planetary gear transmission. This arrangement avoids the need for separate fixings.

In a preferred embodiment of the invention the outer (typically circular) periphery is defined by a housing of the planetary gear transmission that lies on a first side of the planetary gear mount; and the planetary gear transmission includes an axle protruding therefrom, the axle extending on a second side of the planetary gear mount opposite the first side. If desired the axle may be of the same design as that disclosed in U.S. Pat. No. 7,204,340, in which a longitudinally extendable splined pair of shafts may be attached by way of a pair of universal joints to the output shaft of the planetary gear transmission.

Preferably the spring attachment includes an eye, to which is securable a spring, protruding from the planetary gear mount rearwardly beyond the upper and lower trailing members.

This arrangement means that the spring is secured essentially directly to the circular periphery of the planetary gear transmission, with only the material (typically steel or another automotive alloy having preferred stiffness characteristics) of the planetary gear mount interposed between the spring and the outer periphery. This in turn means that moments generated by the planetary gear transmission are conveyed efficiently to the spring.

Beneficially the upper and lower attachments permit pivoting of the planetary gear mount relative to the trailing members, especially about an axis that is generally perpendicular to the axes of pivoting of the trailing members.

When used in conjunction with a rigid link member, whose length is adjustable, interconnecting the planetary gear mount and the interface member this arrangement permits adjustments of the degree of toe-in of the rear wheels of a tractor or other vehicle in which the IRS is mounted. This is because pivoting of the planetary gear mount directly causes adjustment of the angle of the rear wheel supported by the IRS relative to the vehicle frame.

When so arranged the link member is secured by way of pivoting mounts respectively to the planetary gear mount and the interface member, so as to accommodate changes in the angle between the planetary gear mount and the link member on adjustment of the length of the latter.

In one embodiment of the invention the link member includes two sub-members that are threadedly secured together such that screwing of the thread adjusts the length of the link member. In an alternative arrangement also within the scope of the invention the link member is an hydraulically actuated, length-adjustable strut.

The invention also resides in an agricultural vehicle, especially tractor having rear wheels of larger diameter than its front wheels, including an IRS as defined hereinabove.

Preferably the vehicle includes a spring interconnecting the spring attachment and the frame of the vehicle.

It is also preferable that the vehicle includes a respective left and a right IRS each as defined hereinabove.

BRIEF DESCRIPTION OF THE DRAWINGS

There now follows a description of a preferred embodiment of the invention, by way of non-limiting example, with reference being made to the accompanying drawings in which.

DETAILED DESCRIPTION OF THE INVENTION

Figure 1:
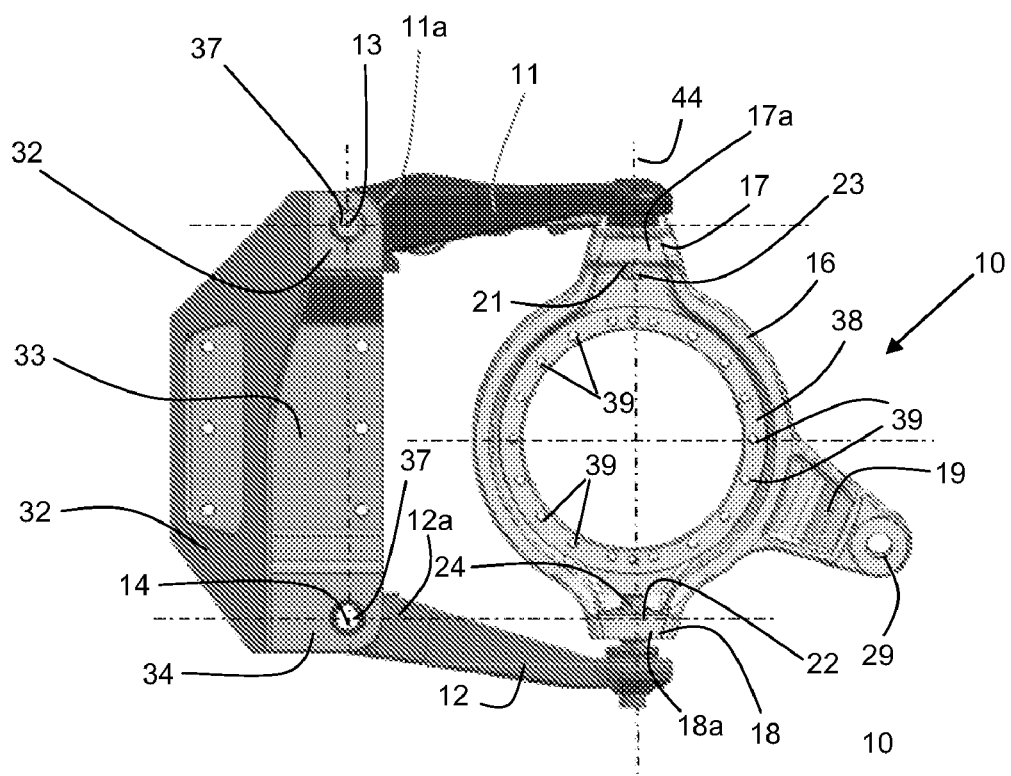
FIG. 1 is a side elevational view of an IRS according to the invention.
Figure 2:
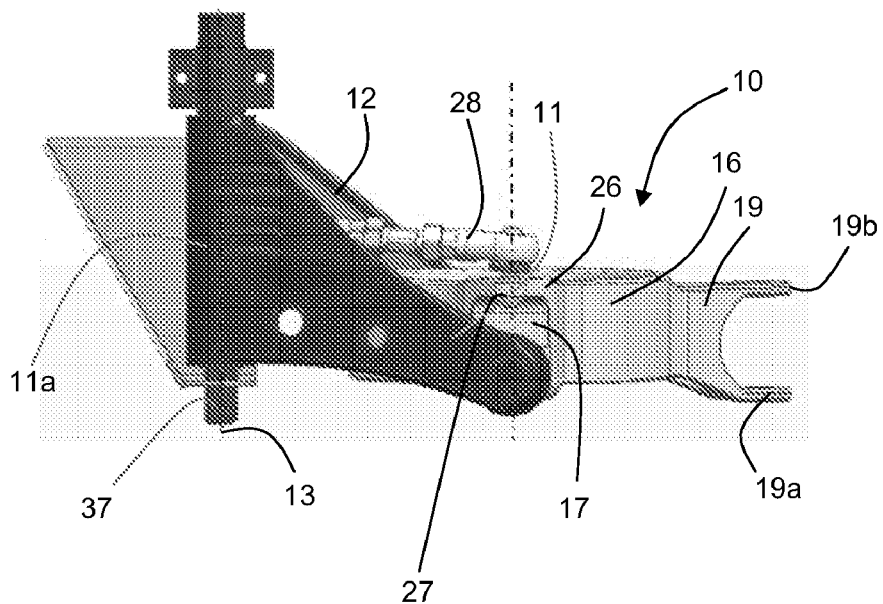
FIG. 2 is a plan view from above of the FIG. 1 components.

Referring to the drawings an IRS 10 for a rear wheel of an agricultural tractor, of the type having a rear wheel diameter that is considerably larger than the diameter of its front wheels, includes upper 11 and lower 12 longitudinally trailing members, "upper" and "lower" being used with reference to the normal orientation of a vehicle.

As used herein a "trailing member" is an elongate member that extends rearwardly relative to the direction of forward motion of the vehicle; and such a member is described as "longitudinally trailing" when as in the embodiment described it extends predominantly in such a rearward direction.

At a frame location 11a, 12a defined at one end of each of the members 11, 12 the trailing members are each pivotably secured for pivoting movement about respective, horizontally extending axes 13, 14.

The trailing members 11, 12 therefore define upper and lower supports between which is retained a planetary gear mount 16 in the form of an essentially annular member having top, bottom and rear bosses 17, 18, 19.

The top and bottom bosses 17, 18 define pivoting attachments that are spaced rearwardly in the IRS from the frame ends of the members 11, 12, and by means of which the planetary gear mount 16 is secured in the IRS.

The top and bottom bosses 17, 18 are formed as cuboidal protuberances 17a, 18a each having formed therein an in-use vertically extending, through-going bore 21, 22.

Each of the trailing members 11, 12 at its end remote from frame ends 11a, 12a includes secured thereto a corresponding pivot pin 23, 24 that in each case extends towards the adjacent bore 21, 22 as appropriate so as to pass therethrough in order to define a pair of upper and lower pivoting attachments for the planetary gear mount 16. Fastenings, bearings, glands, seals and lubricants may be included in the assemblies comprising the pivot pins 23, 24 in per se known ways in order to assure that the upper and lower attachments for the planetary gear mount are rotatable with appropriate stability, robustness and vibration damping.

The top boss 17 also includes formed offset to one side, that in use of the IRS lies remote from the rear wheel it supports, an eye 26 including formed therein a through-going aperture 27. The eye 26 and aperture 27 are used for the purpose of locating a link member 28 in a manner described in more detail below.

The rear boss 19 defines a spring attachment that protrudes from the planetary gear mount 16 on its rear side remote from the frame ends of the trailing members 11, 12.

In the embodiment illustrated the rear boss 19 protrudes below a horizontal diameter of the annulus defined by the planetary gear mount. In other embodiments of the invention the location of the spring mount may differ from the precise position shown; although the arrangement illustrated confers good geometry characteristics on the IRS of the invention.

Figure 4:
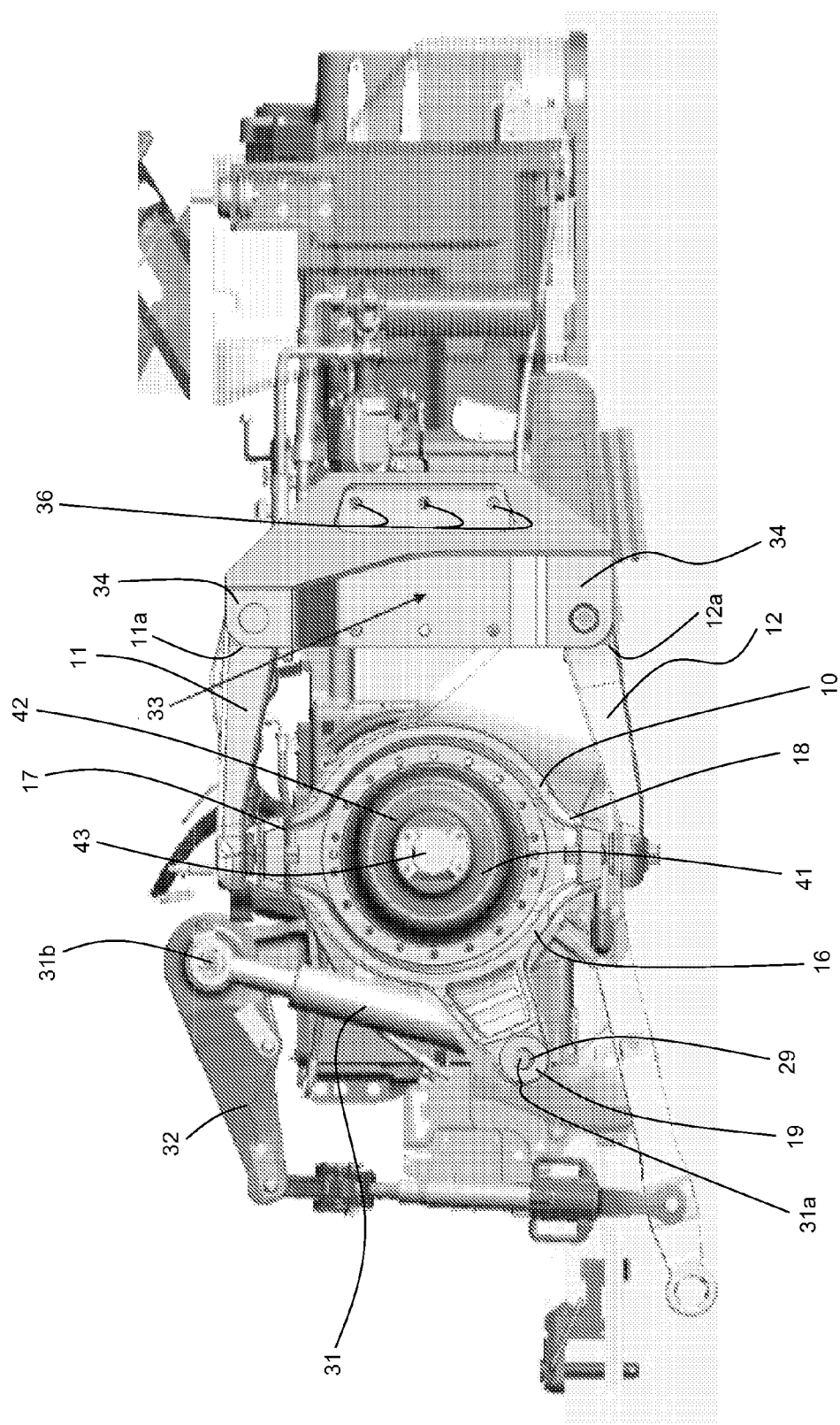
FIG. 4 is a side elevational view of the rear part of the frame of an agricultural tractor, according to the invention, including an IRS such as that of FIGS. 1 and 2; and a spring of conventional design.

Rear boss 19 is formed as a pair of bifurcated yoke arms 19a, 19b each in the form of an attachment eye and therefore having formed therein a through-going bore 29. The bifurcated yoke arms 19a, 19b permit pivotable securing to the boss 19, by way of a per se known pin connection, the lower end 31a of a spring 31 (FIG. 4). In the preferred embodiment of the invention, in which the IRS 10 is installed in an agricultural tractor, the upper end 31b of spring 31 is secured in a similar, pin-connected manner to the pivot axis of the rockshaft 32 of the three point hitch of the tractor.

In the preferred embodiment the spring 31 is a gas spring that combines springing and damping functions in a single, cylindrical unit. Other designs of spring however are feasible within the scope of the invention and include arrangements in which the springing and damping functions are provided by discrete components.

The pivot axes 13, 14 of the upper 11 and lower 12 trailing members are defined in an interface member 32 the main purpose of which is to secure the IRS to the frame of the tractor or other vehicle in which it is installed. In the embodiment illustrated the interface member is a fabricated, rigid structure defining a flat plate 33 having formed therein as illustrated a pattern of apertures 36 through which the interface member 33 may be bolted to a corresponding, flat surface forming part of the vehicle frame.

At upper and lower ends the interface member also defines a respective, protruding ear 34. The purpose of each ear 34 is to define a pivoting attachment for an elongate pin 37.

A respective said elongate pin 37 extends such that its elongate axis coincides with the upper 13 or lower 14 pivot axis described above. A said elongate pin 37 therefore protrudes through each of the upper 11 and lower 12 trailing members so as to define the pivotable securing at the frame ends 11a, 12a. The precise manner of securing of the elongate pins 37 and the trailing members 11, 12 together may be achieved for example through the use of rings, clips and/or grooves of designs that will occur to the worker of skill in the art.

The exact nature of the interface member 33 may of course be varied to suit the precise design of the vehicle frame. The interface member shown in the drawings therefore is intended purely to illustrate certain principles of attachment of the IRS 10, and is not intended to be limiting.

Furthermore although in the embodiment illustrated and described the interface member 33 is a fabricated metal (e.g. steel or another automotive alloy) part, it could be manufactured from other materials such as but not limited to a carbon fibre composite.

As is apparent from the drawing figures, each of the trailing members 11, 12 is defined essentially as a wishbone arm that is wider at its frame end 11a, 12a than at the opposite end. In consequence each elongate pin 37 attaches to its associated trailing member 11, 12 at least two horizontally spaced locations along a respective axis 13, 14.

This arrangement confers on the IRS certain advantages, that are known in wishbone suspension arrangements, relating to the stability and stiffness of the construction. In practice each of the wishbone arms is in continuous contact with the elongate pin 37 over the width of its frame end 11a, 12a, thereby providing an infinite number of point contacts between each elongate pin 37 and its associated trailing member 11, 12. This further enhances the stability of the IRS 10.

In other embodiments of the invention however it need not necessarily be the case that both of the upper and lower trailing members 11, 12 are wishbone arms; and in some arrangements within the scope of the invention lower cost trailing members 11, 12 may be employed.

As explained above, planetary gear mount 16 is essentially annular. The annulus defines a fixing in the form of continuous, inner flange 38 that has formed therein a series of equiangularly spaced, through-going apertures 39. Other patterns of the apertures are possible.

The purpose of flange 38 is to locate the circular, outer periphery of casing 42 of a planetary gear transmission unit 41 (FIG. 4).

The aforesaid outer periphery is formed as a further flange (that is not visible in the figures) of corresponding diameter to inner flange 38. The flange of casing 42 is formed with a series of apertures that on insertion of casing 42 so as partly to protrude through planetary gear mount 16 align in register with the series of apertures 39. The casing 42, and hence the entire planetary gear transmission 41, may then simply be bolted through the aligned apertures so as to be firmly secured to the planetary gear mount 16. As shown in FIG. 4 a major part of casing 42 when so secured lies on the side of planetary gear mount 16 that is remote from the wheel side of the IRS.

As a consequence of this arrangement the casing 42 is rigidly fixed in a non-rotatable manner to the inner flange 38.

As an alternative to bolts of course other fixings, as will occur to the worker of skill in the art, could be employed for the purpose of securing the planetary gear transmission unit 41.

The design of the planetary gear transmission is as set out in U.S. Pat. No. 7,204,340. Therefore the transmission 41 is fixed non-rotatively to the circular interior of the casing 42 of an outer ring gear of the transmission. The planetary gear transmission 41 includes a rotary input shaft that is connected to the main drive shaft of the tractor (or other vehicle) and enters the casing 42 on the side of the IRS that lies remote from the suspended wheel.

Planetary gear transmission 41 includes an internal gear train that includes the fixed ring gear described above. The nature of the planetary gear transmission 41 is, as explained, to transmit via the fixed ring gear, the rigid casing 42 and the planetary gear mount 16 a moment that e.g. when the agricultural vehicle is towing an implement opposes the moment that causes squatting of the IRS 10 and potential lifting of the front part of the vehicle.

Planetary gear transmission 41 includes on the suspended wheel side of IRS 10, protruding from the central aperture of planetary gear mount 16, an axle 43 that transmits rotary drive to the associate drear wheel of the vehicle.

As is explained in U.S. Pat. No. 7,204,340, in one arrangement in accordance with the invention axle 43 includes at either end a flexible joint such as a universal joint; and the length of the axle 43 is adjustable.

The latter effect may readily be achieved for example by constructing the axle 43 as a splined, solid shaft that is received within a correspondingly splined, hollow shaft. In consequence the axle 43 is able to accommodate changes in its length while positively transmitting rotational drive to the associated rear wheel of the vehicle.

Such length-adjustability of the axle 43 is of course necessary in order to accommodate upward and downward movements of the IRS (for example when the vehicle is being driven on a road and is not towing an implement) while maintaining a constant rear wheel track.

As is explained above the planetary gear mount 16 is pivotably received between the upper and lower trailing members 11, 12. The axis 44 of pivoting of the planetary gear mount 16 is generally perpendicular to the axes 13, 14 (i.e. the axes of pivoting of the respective trailing members 11, 12). As a result, pivoting of the planetary gear mount 16 about axis 44 causes adjustments of the degree of toe-in of the rear wheel supported by the IRS 10.

Link member 28 in the embodiment illustrated rigidly interconnects eye 26 on one side of the planetary gear mount 16 to the interface member 32. The length of link member 28 is adjustable so that the toe-in of the wheel may be set.

To this end link member 28 may be formed as two or more threadedly engaged sub-members in the form of rods that on screwing together or apart cause adjustment of the length of member 28. In order to accommodate alterations in the length of link member 28 its attachments at eye 26 and to the interface member 32 are pivotable in a per se known manner.

In an alternative arrangement however the link member 28 may be formed as e.g. an hydraulic strut whose length may be adjusted under the command of a control system. Such an arrangement can provide for an "active" toe-in adjustment that alters in dependence on prevailing ground conditions encountered by the vehicle; or even electronically controlled four-wheel steering, that could be of benefit in reducing the turning circle of the vehicle in short headlands.

Figure 3:
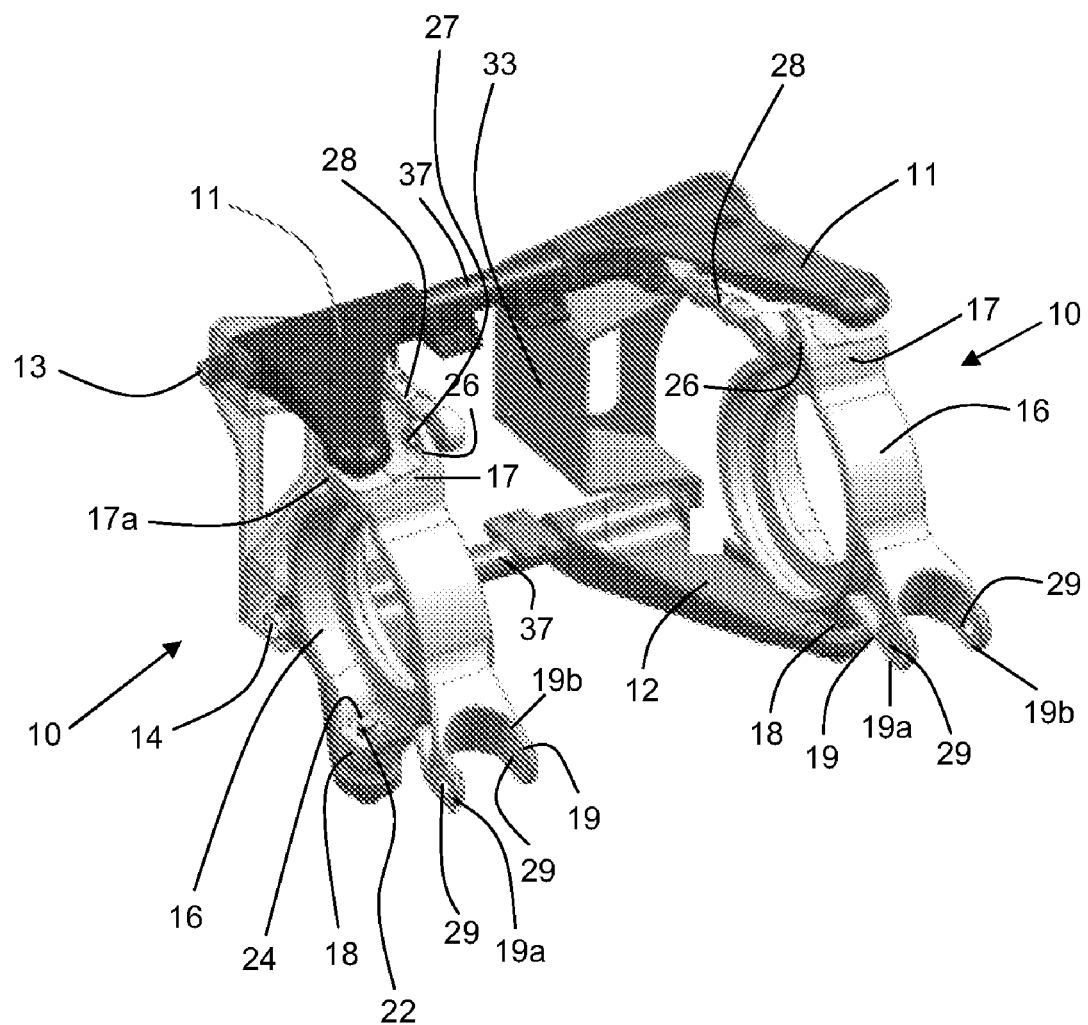
FIG. 3 is a perspective view of a pair of the IRS arrangements of FIGS. 1 and 2 showing how they might be configured in a vehicle.

In a practical arrangement as shown in FIG. 3 a pair of the IRS arrangements 10 according to the invention would be provided, in order to support each of the rear wheels of the vehicle. As illustrated in FIG. 3 in one preferred embodiment a common upper elongate pin 37 and a common lower elongate pin 37 may be provided for the pair of IRS assemblies 10. This advantageously provides for accurate location of the pivot axes 13, 14 and also economises on the parts needed to assemble the suspension of the vehicle.

The components of the IRS 10 may take a variety of forms not illustrated in the drawing figures, and as noted may be manufactured from a range of materials normally encountered in the automotive construction art.

The invention is considered to reside furthermore in a agricultural vehicle including at least one IRS as described herein. In such arrangements as shown in FIG. 3 the vehicle may include a spring 31 interconnecting the IRS and the frame of the vehicle (or another component that is linked to the frame).

We claim:

1. An independent suspension for a rear wheel of an agricultural vehicle, comprising:

upper and lower longitudinal trailing members that are each secured at a frame location for pivoting movement about respective upper and lower, horizontally extending axes, the pivoting movement limited to rotation within a plane generally perpendicular to the horizontal axis;

one or more interface members for securing each trailing member to a vehicle chassis, the interface member and the chassis location of the trailing members defining respective upper and lower pin joints that pivotably secure the trailing members and define the upper and lower, horizontally extending axes, wherein at least one of the trailing members is a generally triangular, longitudinally trailing member that is pivotally secured at two or more spaced locations along the horizontally extending axis about which it pivots;

a planetary gear mount that is rotatably secured between the trailing members at upper and lower attachments that are spaced from frame ends of the trailing members;

a rigid link member interconnecting the planetary gear mount and the interface member through the trailing member, such that the rigid link member moves with the trailing member; and a spring attachment that protrudes from the planetary gear mount.

2. The independent suspension of claim 1 wherein a distance between the upper attachments of the trailing member remains constant.

3. The independent suspension of claim 1 wherein the planetary gear mount includes an annulus having formed therein or secured thereto one or more fixings permitting securing to the planetary gear mount of a part of a planetary gear transmission.

4. The independent suspension of claim 3 wherein the one or more fixings include a series of apertures or recesses that are formed at equiangularly spaced intervals about the annulus.

5. The independent suspension of claim 1 further comprising a planetary gear transmission having an outer periphery and secured to the planetary gear mount so as to prevent rotation of the outer periphery relative to the planetary gear mount.

6. The independent suspension of claim 5 wherein the outer periphery includes a circular periphery that is received in the annulus and secured to the planetary gear mount by way of the one or more fixings.

7. The independent suspension of claim 5 wherein the planetary gear transmission includes a ring gear that is fixed relative to the outer periphery.

8. The independent suspension of claim 5 wherein the outer periphery is defined by a housing of the planetary gear transmission that lies on a first side of the planetary gear mount, and wherein the planetary gear transmission includes and axle protruding therefrom, the axle extending on a second side of the planetary gear mount opposite the first side.

9. The independent suspension of claim 1 wherein the planetary gear mount includes formed integrally therewith a casing of a planetary gear transmission.

10. The independent suspension of claim 1 wherein the spring attachment includes an eye, to which is securable a spring, protruding from the planetary gear mount rearward beyond the upper and lower trailing members.

11. The independent suspension of claim 1 wherein upper and lower attachments permit pivoting of the planetary gear mount relative to the trailing members.

12. The independent suspension of claim 1 wherein a length of the link member is adjustable and wherein the link member is secured by way of pivoting mounts respectively to the planetary gear mount and the interface member.

13. The independent suspension of claim 12 wherein the link member includes two sub-members that are threadedly secured together such that screwing to thread adjusts the length of the link member.

14. The independent suspension of claim 13 wherein the link member is a hydraulically actuated, length-adjustable strut.

15. An agricultural vehicle comprising:
an independent suspension for a rear wheel of the agricultural vehicle, comprising:
upper and lower longitudinal trailing members connected to a frame location and configured for pivoting movement limited to rotation about respective upper and lower, horizontally extended axes;
a planetary gear mount that is pivotally secured between the trailing members at upper and lower attachments that are spaced from frame ends of the trailing members and a spring attachment that protrudes from the planetary gear mount; and
a rigid link member interconnecting the planetary gear mount and an interface member through the trailing member, such that when the trailing member moves the connection of the rigid link member and the trailing member is moved therewith.

16. The agricultural vehicle of claim 15 including a frame and a spring interconnecting the spring attachment and the frame.

17. The agricultural vehicle of claim 15 including a respective left and a right independent suspension.

* * * * *